(12) United States Patent
Kato et al.

(10) Patent No.: US 7,104,615 B2
(45) Date of Patent: Sep. 12, 2006

(54) VEHICLE MOTION CONTROL APPARATUS

(75) Inventors: Toshihisa Kato, Handa (JP); Shingo Nishigaki, Kariya (JP)

(73) Assignee: Advics Co., Ltd., Kariya (JP)

( * ) Notice: Subject to any disclaimer, the term of this patent is extended or adjusted under 35 U.S.C. 154(b) by 0 days.

(21) Appl. No.: 10/892,429

(22) Filed: Jul. 16, 2004

(65) Prior Publication Data
US 2005/0012389 A1    Jan. 20, 2005

(30) Foreign Application Priority Data
Jul. 17, 2003    (JP)    ............................. 2003-275796

(51) Int. Cl.
B60T 8/60    (2006.01)
(52) U.S. Cl. .................................... 303/146; 303/113.1
(58) Field of Classification Search ................ 303/146, 303/147, 148, 113.1, 113.5; 701/72
See application file for complete search history.

(56) References Cited

U.S. PATENT DOCUMENTS

| | | | |
|---|---|---|---|
| 4,898,431 A | | 2/1990 | Karnopp et al. |
| 5,645,326 A | * | 7/1997 | Sano ........................... 303/146 |
| 5,722,743 A | * | 3/1998 | Sano ........................... 303/146 |
| 5,727,853 A | | 3/1998 | Monzaki |
| 5,842,754 A | * | 12/1998 | Sano ........................... 303/147 |
| 5,934,769 A | * | 8/1999 | Brachert et al. ............. 303/146 |
| 6,074,018 A | | 6/2000 | Zeiner et al. |
| 6,142,581 A | | 11/2000 | Yamaguchi et al. |
| 6,223,115 B1 | * | 4/2001 | Batistic ........................ 701/72 |
| 6,702,402 B1 | * | 3/2004 | Sawada et al. .......... 303/113.1 |
| 6,758,537 B1 | * | 7/2004 | O'Dea et al. ............ 303/113.1 |
| 6,866,349 B1 | * | 3/2005 | Sauter et al. ............... 303/148 |
| 6,961,649 B1 | * | 11/2005 | Kato et al. ..................... 701/70 |

FOREIGN PATENT DOCUMENTS

| | | |
|---|---|---|
| DE | 195 15 050 A1 | 5/1996 |
| DE | 197 47 754 A1 | 7/1998 |
| JP | 9-240455 | 9/1997 |
| JP | 10-24821 | 1/1998 |
| JP | 10-211873 | 8/1998 |

(Continued)

OTHER PUBLICATIONS

German Patent Office First Official Letter/Examination Report of Nov. 24, 2005.

(Continued)

*Primary Examiner*—Thomas Williams
(74) *Attorney, Agent, or Firm*—Buchanan Ingersoll PC

(57) ABSTRACT

The present invention is directed to a vehicle motion control apparatus, which includes a hydraulic pressure regulating device disposed between a master cylinder and a pair of wheel brake cylinders included in each of a dual hydraulic circuit, and a monitor for monitoring state variable of the vehicle. A desired value is provided for a wheel brake cylinder operatively associated with a wheel to be controlled, on the basis of the state variable. The regulating device is controlled in response to a result of comparison between the desired value and the state variable, to regulate the pressure in at least the wheel brake cylinder operatively associated with said wheel to be controlled. A pressure increasing gradient of the hydraulic braking pressure in the wheel brake cylinder operatively associated with the wheel to be controlled, is set in response to a result of comparison between the desired value and the state variable. The pressure increasing gradient provided when the brake pedal is depressed is set to be steeper than that provided when the brake pedal is not depressed.

5 Claims, 8 Drawing Sheets

FOREIGN PATENT DOCUMENTS

| | | |
|---|---|---|
| JP | 11-301435 | 11/1999 |
| JP | 2000-503279 | 3/2000 |
| JP | 3045057 | 3/2000 |
| JP | 3058172 | 4/2000 |

OTHER PUBLICATIONS

Translation of German Patent Office First Official Letter/Examination Report of Nov. 24, 2005.

* cited by examiner

VEHICLE MOTION CONTROL APPARATUS

This application claims priority under 35 U.S.C. Sec. 119 to No. 2003-275796 filed in Japan on Jul. 17, 2003, the entire content of which is herein incorporated by reference.

BACKGROUND OF THE INVENTION

1. Field of the Invention

The present invention relates to a vehicle motion control apparatus, particularly relates to the vehicle motion control apparatus for regulating a hydraulic braking pressure supplied to at least one wheel brake cylinder out of a pair of wheel brake cylinders included in a hydraulic circuit, to restrain an excessive oversteer and/or an excessive understeer, thereby to maintain stability of a vehicle in motion.

2. Description of the Related Arts

As for a vehicle motion control apparatus, there is disclosed in Japanese Patent No. 3058172, which corresponds to the U.S. Pat. No. 4,898,431, for example, an apparatus for controlling vehicle motion, by determining a desired yaw rate of a vehicle, and controlling braking force in response to a comparison of the desired yaw rate with a sensed actual yaw rate of the vehicle to maintain a vehicle stability during the vehicle motion.

In Japanese Patent Laid-open publication No. 10-211873, a vehicle posture control apparatus has been proposed, so as to enable a vehicle driver to depress a brake pedal even when a vehicle posture control is being performed, and enable the posture control to be performed by his own braking operation. In this publication, it is described that the apparatus is provided with two circuits of brake conduits for communicating a master cylinder with a pair of brake cylinders out of four brake cylinders, respectively, a pair of cut-off valves for shutting off the communication between the master cylinder and the brake conduit of each circuit to be capable of being opened or closed, and a hydraulic pressure source provided for supplying brake pressure individually to the two circuits of brake conduits. As for means for controlling the vehicle posture, there are disclosed a main control section for regulating the brake pressure supplied from the pressure source into each brake cylinder, with the pair of cut-off valves placed in their closed positions to shut off the communication between the master cylinder and all of the brake cylinders, and an opening motion control section for controlling one of the cut-off valves to be changed over to an open state, when braking operation by the vehicle driver is detected by braking operation detection means.

Also, in Japanese Patent (PCT) Laid-open publication No. 2000-503279, which corresponds to the U.S. Pat. No. 6,074,018, there is disclosed a motor vehicle braking system with traction control and/or movement dynamics regulating device, as explained hereinafter. That is, to enable building up brake pressure rapidly, one additional pump is provided in each brake circuit, whose intake side is connected directly to a master cylinder, and between an intake side of the additional pump and the master cylinder, there are no hydraulic components that would act as throttles and thereby delay the brake pressure buildup. Then, with respect to an improvement of the intake side of the additional pump and its effect, it is described that the invention has the advantage of a rapid brake pressure buildup when the master cylinder is not actuated. Furthermore, it is described (with reference numerals omitted herein) that a switchover valve is embodied as a controllable differential pressure valve, that is, a pressure difference between the wheel brake cylinder side and the master cylinder side can be established, with the pressure higher on the wheel brake cylinder side. In the exemplary embodiment shown, the switchover valve is a differential pressure proportional magnet valve. Then, it is described that if a tendency to locking or slipping occurs at one of the vehicle wheels, or if the electronic control unit by means of its gyroscope finds that the vehicle is threatening to skid, then the pump motor is turned on, and that an individual-wheel brake pressure regulation is effected in a manner known per se using the return pump, brake pressure buildup valves, and brake pressure reduction valves.

In Japanese Patent Laid-open publication No. 11-301435, there is disclosed a linear pressure difference valve for use in a brake-by-wire system, similar to the valve as shown in FIG. 1 of the publication No. 2000-503279. Then, it is described (with reference numerals omitted herein) that the linear pressure difference valves allow the flow of brake fluid between a reservoir and each wheel cylinder, almost without flow resistance, at a communication position through each valve member. A valve state with the valve member placed in a pressure difference position is controlled by electric current fed to each solenoid, to control an amount of the valve member lifted from a valve seat. In the pressure difference position, the state of the valve member can be controlled from a position for completely shutting off a conduit to a throttle position, in response to the lifted amount. In the case where the lifted amount corresponds to an approximately intermediate position from the valve seat, the throttle position has been provided for the conduit, thereby to restrict the brake fluid from flowing from the wheel cylinder to the reservoir. As a result, the brake pressure in the wheel cylinder (wheel cylinder pressure) can be held with the pressure difference against the reservoir. And, there is disclosed in Japanese Patent Laid-open publication No. 9-240455, which corresponds to the U.S. Pat. No. 6,142,581, a reservoir having a function for shutting off an intake passage for a hydraulic pressure pump when introducing brake fluid, as indicated by "200" in FIG. 6 of the Japanese publication No. 9-240455.

In order to improve a decelerating response of a vehicle, when a vehicle driver makes a braking operation while a vehicle motion control is being performed, a vehicle motion control apparatus has been proposed in Japanese Patent Laid-open publication No. 10-24821, wherein braking force applied to each wheel of the vehicle is detected by wheel braking force detection means, and wherein motion control means prohibits a wheel to be controlled from being controlled thereby, when the braking force applied to a wheel not to be controlled by the motion control means exceeds the braking force applied to the wheel to be controlled, while the vehicle motion control is being performed. And, the motion control means includes turning control means for applying the braking force to a first wheel out of all the wheels, so as to modify a vehicle moment for forcing the vehicle to be in a stable state, and deceleration control means for applying the braking force to a second wheel out of all the wheels, except for the first wheel, so as to reduce the vehicle speed.

As for the wheel braking force detection means, in Japanese Patent Laid-open publication No. 10-24821, for example, employed is wheel deceleration detection means for calculating a deceleration of each wheel on the basis of a wheel speed detected by a wheel speed sensor. Therefore, it is described that such an expensive sensor as a master cylinder pressure sensor, or wheel cylinder pressure sensor is not required. More practically, the deceleration control is prohibited, when a brake switch (stop switch) has been turned on for a period longer than a predetermined time, and when acceleration of the wheel not to be controlled is smaller than acceleration of the wheel whose deceleration is to be controlled. Furthermore, in Japanese Patent No. 3045057, disclosed is a vehicle behavior control apparatus for terminating a behavior control when hunting might be caused in the behavior control. In practice, when the braking force is applied to a wheel and released from the same, repeatedly and continuously, it is determined that the hunting might be caused in the behavior control. In order to stable the behavior, therefore, it is proposed to prohibit the braking force from being applied to each wheel.

According to the apparatuses as disclosed in the above publication Nos. 10-211873 and 2000-503279, however, it is required that the hydraulic pressure discharged from the hydraulic pressure pump is regulated by controlling the brake pressure buildup valves and brake pressure reduction valves, with the communication with the master cylinder being shut off, when the control for maintaining a stability of the vehicle in motion (i.e., vehicle stability control) is performed. Therefore, required is a master cylinder pressure sensor as disclosed in the above publication No. 10-211873 for detecting the master cylinder pressure discharged in response to braking operation of the vehicle driver while the vehicle stability control is being performed. And, presumably, the apparatus as disclosed in the above publication No. 2000-503279 will also require a hydraulic pressure sensor similar to the sensor as described above.

However, the pressure sensor for detecting the master cylinder pressure is very expensive, so that if it is not required to detect the operation of the brake pedal during the vehicle stability control, and if the hydraulic pressure sensor can be omitted, a great cost down can be achieved. Supposing that the linear pressure difference valve as disclosed in the above publication No. 11-301435, or known linear solenoid valves are employed, and that switching valves for use in the vehicle stability control are controlled in a different manner from the prior control manner, the vehicle stability control can be performed smoothly, without the expensive master cylinder pressure sensor provided in the apparatus.

As for an embodiment for controlling valves or the like in the stability control, may be employed for example a so-called diagonal control system, wherein a hydraulic circuit connected to wheel brake cylinders is divided into two hydraulic circuits each including a pair of wheel brake cylinders, and a hydraulic pressure regulating device is disposed between a master cylinder and a pair of wheel brake cylinders included in each hydraulic circuit, and wherein one of the pair of wheel brake cylinders is selected to be the one operatively associated with the wheel to be controlled, so that the hydraulic braking pressure therein is regulated in response to the vehicle state variable, whereby the vehicle stability control may be performed smoothly, without the master cylinder pressure sensor. In the case where the vehicle stability control is being performed according to the diagonal control system, however, when the brake pedal is depressed to terminate the vehicle stability control, the hunting might be caused, so that the stability control might not be terminated smoothly.

In the mean time, it is described in the above publication No. 10-24821 that without using any expensive sensors such as master cylinder pressure sensor or wheel cylinder pressure sensor, motion control means can prohibit the wheel to be controlled from being controlled, when the braking force applied to the wheel not to be controlled exceeds the braking force applied to the wheel to be controlled. However, this relates to the deceleration control on the basis of the comparison between the braking force applied to the wheel to be controlled and the braking force applied to the wheel not to be controlled, without directly using the brake pressure increased in response to operation of the brake pedal.

Although it is proposed in the Japanese Patent No. 3045057 that when the hunting might be caused in the behavior control, the behavior control shall be terminated. As a result, the hunting will be prevented, while a trace property will be deteriorated. It is, therefore desired that the hunting can be prevented by decelerating the vehicle speed, with the trace property being maintained as the effect of the stability control. Particularly, in case of the diagonal control system as described above, the apparatus as disclosed in the Japanese Patent No. 3045057 will not act as an appropriate countermeasure against the hunting that will be caused when the brake pedal is depressed during the stability control, thereby to terminate the control.

SUMMARY OF THE INVENTION

Accordingly, it is an object of the present invention to provide an inexpensive vehicle motion control apparatus for performing a vehicle stability control appropriately, with a simple structure, without a master cylinder pressure sensor or the like being required, and capable of applying appropriate braking force to each wheel, when a brake pedal is depressed during the vehicle stability control.

In accomplishing the above and other objects, the vehicle motion control apparatus includes wheel brake cylinders operatively associated with wheels of a vehicle, respectively, and a master cylinder which is connected to the wheel brake cylinders through a dual hydraulic circuit with a pair of wheel brake cylinders included in each hydraulic circuit, and which discharges a hydraulic braking pressure into each hydraulic circuit in response to operation of a brake pedal. Between the master cylinder and the pair of wheel brake cylinders, a hydraulic pressure regulating device is provided for regulating the hydraulic braking pressure supplied into each of the pair of wheel brake cylinders. A vehicle state monitor is provided for monitoring state variable of the vehicle. A desired value setting unit is provided for setting a desired value provided for a wheel brake cylinder operatively associated with a wheel to be controlled, out of the pair of wheel brake cylinders included in each hydraulic circuit, to set the desired value on the basis of the state variable monitored by the vehicle state monitor. And, a control unit is provided for controlling the pressure regulating device to regulate the hydraulic braking pressure in at least the wheel brake cylinder operatively associated with the wheel to be controlled. The control unit sets a pressure increasing gradient of the hydraulic braking pressure in the wheel brake cylinder operatively associated with the wheel to be controlled, in response to a result of comparison between the desired value set by the desired value setting unit and the state variable monitored by the vehicle state monitor. In this case, the pressure increasing gradient provided when the brake pedal is depressed is set to be steeper than the pressure increasing gradient provided when the brake pedal is not depressed.

In the apparatuses as described above, the vehicle state monitor may include a yaw rate detection device for detecting an actual yaw rate of the vehicle, and the control unit may include a desired yaw rate setting unit for setting a desired yaw rate served as the desired value, and a yaw rate deviation calculation unit for calculating a yaw rate deviation between the desired yaw rate set by the desired yaw rate setting unit and the actual yaw rate detected by the yaw rate detection device. And, the control unit sets the pressure increasing gradient on the basis of the yaw rate deviation calculated by the yaw rate deviation calculation unit.

In the apparatuses as described above, the hydraulic pressure regulating device in each of the hydraulic circuits may include a normally open switching valves each of which is disposed between the master cylinder and each of the pair of wheel brake cylinders, and each of which supplies the hydraulic braking pressure discharged from the master cylinder into each of the pair of wheel brake cylinders when each of the normally open switching valves is placed in an open position thereof, and a normally closed switching valves each of which is connected to a passage between each of the normally open switching valves and each of the pair of wheel brake cylinders, and each of which reduces the hydraulic braking pressure in each of the pair of wheel brake cylinders when each of the normally closed switching valves is placed in an open position thereof. A proportional pressure difference valve device is disposed between the master cylinder and the normally open switching valves in each hydraulic circuit, to regulate a pressure difference between the hydraulic pressure at the side of the master cylinder and the hydraulic pressure at the side of the normally open switching valves to provide a desired pressure difference. And, an automatic hydraulic pressure generating device is provided for generating a hydraulic braking pressure independently of the master cylinder and irrespective of operation of the brake pedal, and supplying the hydraulic braking pressure into a passage between the valve device and the normally open switching valves in each hydraulic circuit. The control unit controls the normally open switching valve connected to one of the wheel brake cylinders not to be controlled in one hydraulic circuit of the dual hydraulic circuits, to be placed in the closed position, and controls the pressure generating device in response to the result of comparison between the desired value and the state variable of the vehicle monitored by the vehicle state monitor, and controls the proportional pressure difference valve device, with the normally open switching valve connected to the wheel brake cylinder operatively associated with the wheel to be controlled, being placed in the open position, and with the pressure increasing gradient provided when the brake pedal is depressed being set to be steeper than the pressure increasing gradient provided when the brake pedal is not depressed.

The proportional pressure difference valve device may include a proportional solenoid valve which is disposed between the master cylinder and the normally open switching valves in each hydraulic circuit, to regulate the pressure difference between the hydraulic pressure at the side of the master cylinder and the hydraulic pressure at the side of the normally open switching valves to provide the desired pressure difference, and further include a relief valve which is disposed in parallel with the proportional solenoid valve for allowing the brake fluid to flow from the normally open switching valves toward the master cylinder when the hydraulic pressure at the side of the proportional solenoid valve exceeds a predetermined upper limit pressure.

Or, the proportional pressure difference valve device may include a proportional pressure difference valve which is disposed between the master cylinder and the normally open switching valves in each hydraulic circuit. In this case, the control unit may be arranged to select one of a communication position for the valve where flow of brake fluid is allowed through the valve, and a pressure difference position for the valve where flow of the brake fluid is restricted on the basis of the pressure difference between the hydraulic pressure at the side of the master cylinder and the hydraulic pressure at the side of the normally open switching valves to the desired pressure difference.

BRIEF DESCRIPTION OF THE DRAWINGS

The above stated object and following description will become readily apparent with reference to the accompanying drawings, wherein like referenced numerals denote like elements, and in which.

DESCRIPTION OF THE PREFERRED EMBODIMENTS

Figure 1:
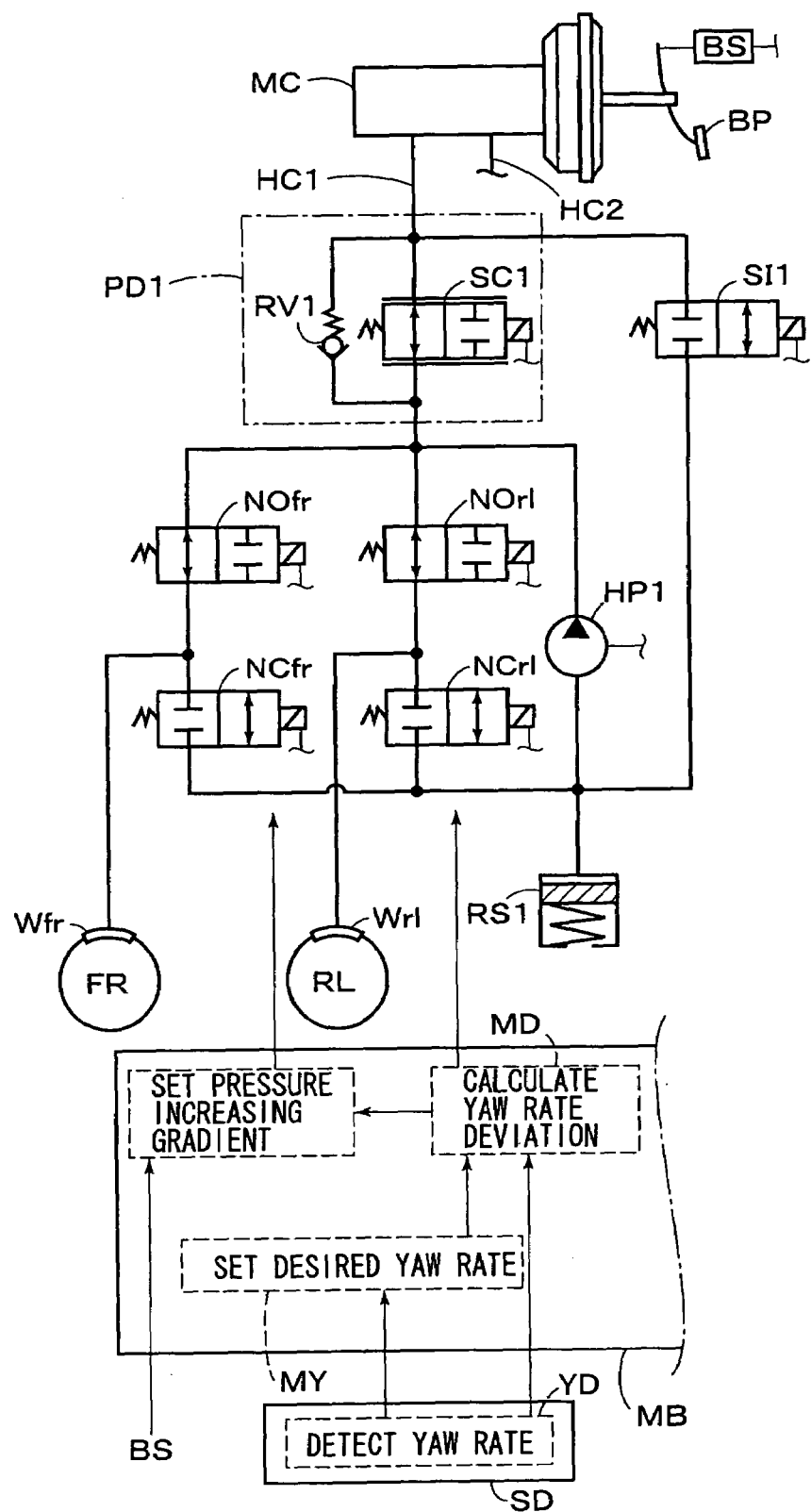
FIG. 1 is a schematic block diagram of a vehicle motion control apparatus according to an embodiment of the present invention.

Referring to FIG. 1, there is schematically illustrated a vehicle motion control apparatus according to the present invention, with a dual hydraulic circuit divided into one hydraulic circuit (HC1) and the other hydraulic circuit (HC2), the latter of which is substantially the same as the former one, and therefore omitted in FIG. 1. The hydraulic circuit (HC1) includes a pair of wheel brake cylinders Wrl and Wfr which are operatively associated with wheels RL and FR of a vehicle, respectively. A master cylinder MC is connected to the wheel brake cylinders (including Wrl and Wfr) through the dual hydraulic circuit, to discharge a hydraulic braking pressure into each hydraulic circuit in response to operation of a brake pedal BP. And, normally open solenoid operated switching valves NOrl and NOfr (hereinafter, simply referred to as normally open valves NOrl and NOfr) are each disposed between the master cylinder MC and each of the wheel brake cylinders Wrl and Wfr. When each of the normally open valves NOrl and NOfr is placed in an open position thereof, the hydraulic braking pressure discharged from the master cylinder MC is supplied into each of the wheel brake cylinders Wrl and Wfr, through a proportional solenoid valve SC1 which will be described later in detail. Also, normally closed solenoid operated switching valves NCrl and NCfr (hereinafter, simply referred to as normally closed valves NCrl and NCfr) are each connected to a passage between each of the normally open valves NOrl and NOfr and each of the wheel brake cylinders Wrl and Wfr. The normally closed valves NCrl and NCfr are connected to a reservoir RS1 that stores the brake fluid drained from the wheel brake cylinders Wrl and Wfr. When each of the normally closed valves NCrl and NCfr is placed in an open position thereof, therefore, the hydraulic braking pressure in each of the wheel brake cylinders Wrl and Wfr is reduced.

The proportional solenoid valve SC1 as mentioned above is disposed between the master cylinder MC and the normally open valves NOrl and NOfr in the hydraulic circuit (HC1). In parallel with the proportional solenoid valve SC1, a relief valve RV1 is disposed so as to allow the brake fluid to flow from the normally open valves NOrl and NOfr toward the master cylinder MC when the hydraulic pressure at the side of the proportional solenoid valve SC1 exceeds a predetermined upper limit pressure. The proportional solenoid valve SC1 and relief valve RV1 serve as a proportional pressure difference valve device PD1, wherein the proportional solenoid valve SC1 is actuated to regulate a pressure difference between the hydraulic pressure at the side of the master cylinder MC and the hydraulic pressure at the side of the normally open valves NOrl and NOfr to provide a desired pressure difference, within the predetermined upper limit pressure provided by the relief valve RV1.

Furthermore, there is provided a hydraulic pressure pump HP1, which serves as an automatic hydraulic pressure generating device of the present invention, and which generates a hydraulic braking pressure independently of the master cylinder MC and irrespective of operation of the brake pedal BP, to supply the hydraulic braking pressure into a passage between the proportional solenoid valve SC1 and the normally open valves NOrl and NOfr. According to the present embodiment, an inlet of the hydraulic pressure pump HP1 is connected to the reservoir RS1, and connected to the master cylinder MC through an inlet valve SI1, which is formed by a normally closed solenoid operated switching valve.

According to the present embodiment, a vehicle state monitor SD is provided for monitoring state variable of the vehicle, and includes a yaw rate detection device YD for detecting an actual yaw rate of the vehicle, which is fed to a control unit MB. The control unit MB of the present embodiment includes a desired yaw rate setting unit MY for setting a desired yaw rate of the vehicle, and a yaw rate deviation calculation unit MD, which calculates a deviation between the desired yaw rate set by the desired yaw rate setting unit MY and the actual yaw rate detected by the yaw rate detection device YD. According to the control unit MB, the hydraulic braking pressure in one of wheel brake cylinders in each hydraulic circuit (e.g., the wheel brake cylinder Wrl operatively associated with a wheel RL to be controlled for the vehicle stability control) is regulated on the basis of the state variable monitored by the vehicle state monitor SD, e.g., the calculated result of the yaw rate deviation calculation unit MD.

According to the control unit MB, therefore, on the basis of the result of the vehicle state monitor SD, the hydraulic pressure pump HP1 is controlled, and the normally open valve NOfr, which is connected to the wheel brake cylinder Wfr, is placed in its closed position. In this state, on the basis of the result calculated by the yaw rate deviation calculation unit MD, the proportional solenoid valve SC1 is controlled, and the normally open valve NOrl and normally closed valve NCrl, which are connected to the wheel brake cylinder Wrl, are controlled, thereby to maintain the vehicle stability. During a stability control, if the brake pedal BP is depressed, the controls for actuating the normally open valve NOrl and normally closed valve NCrl (connected to the wheel brake cylinder Wrl) are terminated. In this case, a pressure increasing gradient of the hydraulic braking pressure in the wheel brake cylinder Wrl operatively associated with the wheel RL to be controlled, is set in response to the calculated result of the yaw rate deviation calculation unit MD. On the basis of the pressure increasing gradient, the proportional valve SC1 is controlled to regulate the hydraulic braking pressure in the wheel brake cylinder Wrl. Particularly, the increasing gradient provided when the brake pedal BP is depressed (the brake switch BS is turned on) is set to be steeper than the pressure increasing gradient provided when the brake pedal BP is not depressed (the brake switch BS is turned off). Consequently, appropriate braking force is applied to the wheel to be controlled (e.g., RL), thereby to be shifted into a normal braking operation, as will be described later in detail with reference to FIG. 7.

Figure 2:
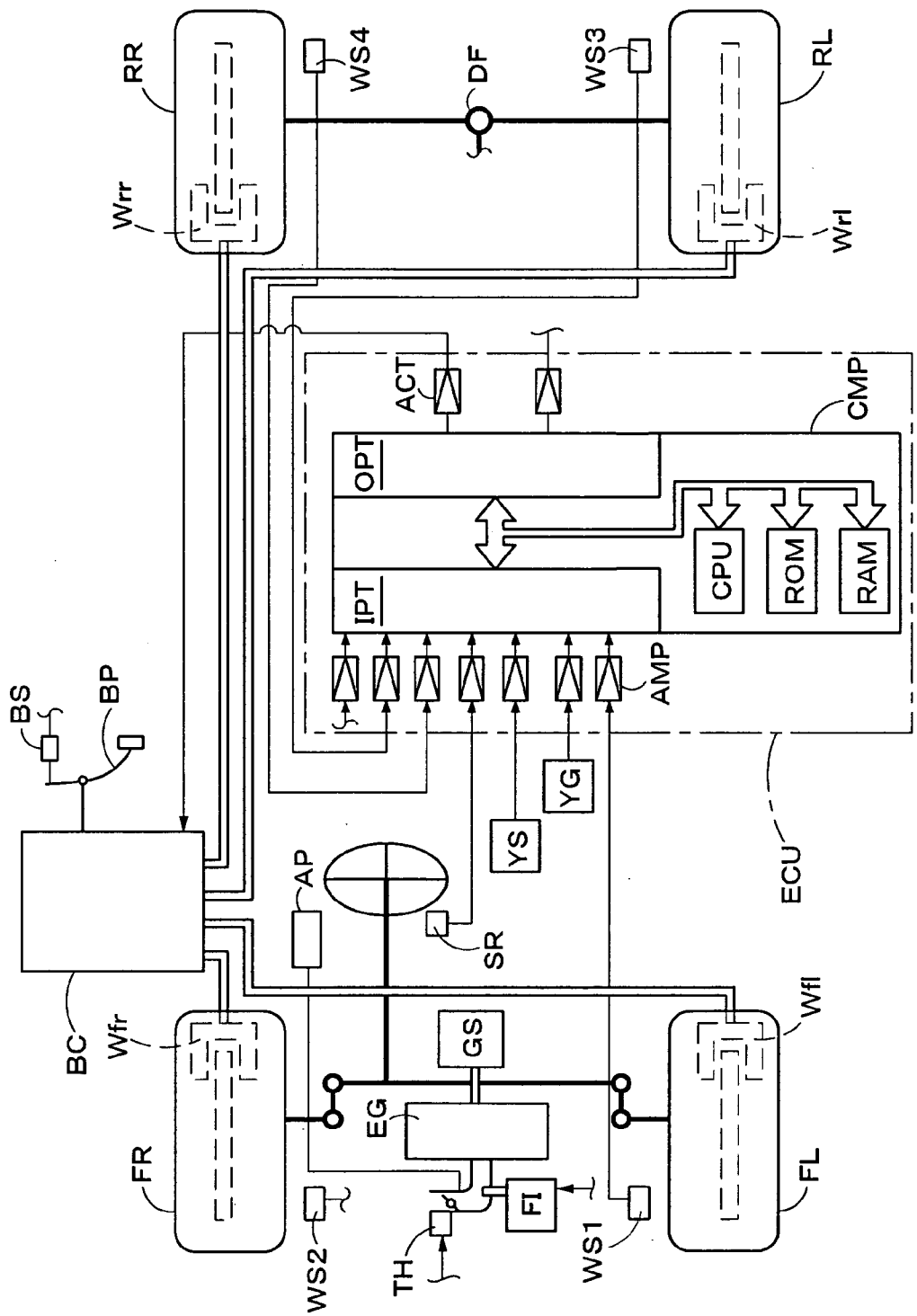
FIG. 2 is a schematic block diagram of a vehicle including a vehicle motion control apparatus according to an embodiment of the present invention.
Figure 3:
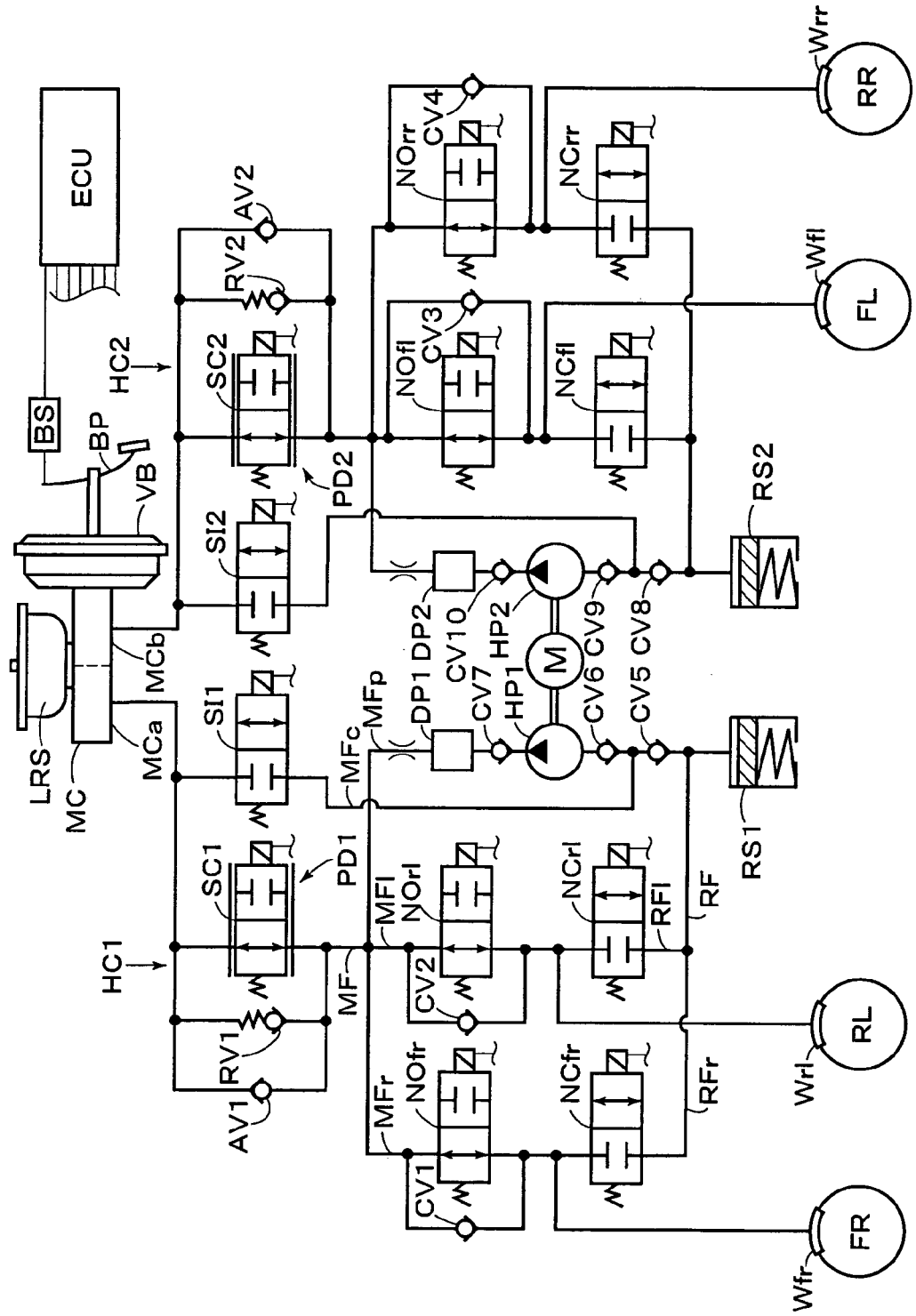
FIG. 3 is a block diagram illustrating a hydraulic brake system according to an embodiment of the present invention.

FIG. 2 shows a vehicle including the embodiment as shown in FIG. 1 and a hydraulic brake system as constituted in FIG. 3. In FIG. 2, the vehicle has an engine EG provided with a fuel injection apparatus FI and a throttle control apparatus TH which is adapted to control a throttle opening in response to operation of an accelerator pedal AP. Also, the throttle opening of the throttle control apparatus TH is controlled and the fuel injection apparatus FI is actuated to control the fuel injected into the engine EG, in response to output of the electronic control unit ECU, which serves as the control unit MB in FIG. 1. In FIG. 2, a wheel FL designates the wheel at the front left side as viewed from the position of a driver's seat, a wheel FR designates the wheel at the front right side, a wheel RL designates the wheel at the rear left side, and a wheel RR designates the wheel at the rear right side. These wheels are operatively associated with wheel brake cylinders Wfl, Wfr, Wrl and Wrr, respectively. According to the present embodiment, the engine EG is operatively connected with the rear wheels RL and RR through a transmission GS and a differential gear apparatus DF, which is controlled in response to output of the electronic control unit ECU, so that a shift-down can be made automatically to provide a so-called engine-brake for reducing a vehicle speed. Thus, a so-called rear drive system is constituted in FIG. 2, while the drive system is not limited to the rear drive system, but the present invention is applicable to a front drive system or a four-wheel drive system.

In the vicinity of the wheels FL, FR, RL and RR, there are provided wheel speed sensors WS1–WS4, respectively, which are connected to the electronic control unit ECU, and by which a signal having pulses proportional to a rotational speed of each wheel, i.e., a wheel speed signal is fed to the electronic control unit ECU. There are also provided a brake switch BS which turns on when the brake pedal BP is depressed, and turns off when the brake pedal BP is released, a steering angle sensor SR for detecting a steering angle of the vehicle, a yaw rate sensor YS for detecting a yaw rate of the vehicle, a lateral acceleration sensor YG for detecting a vehicle lateral acceleration, a throttle sensor (not shown) and the like. These are electrically connected to the electronic control unit ECU to control the engine EG and/or a hydraulic brake control apparatus BC, the latter of which will be explained later in detail with reference to FIG. 3.

Figure 4:
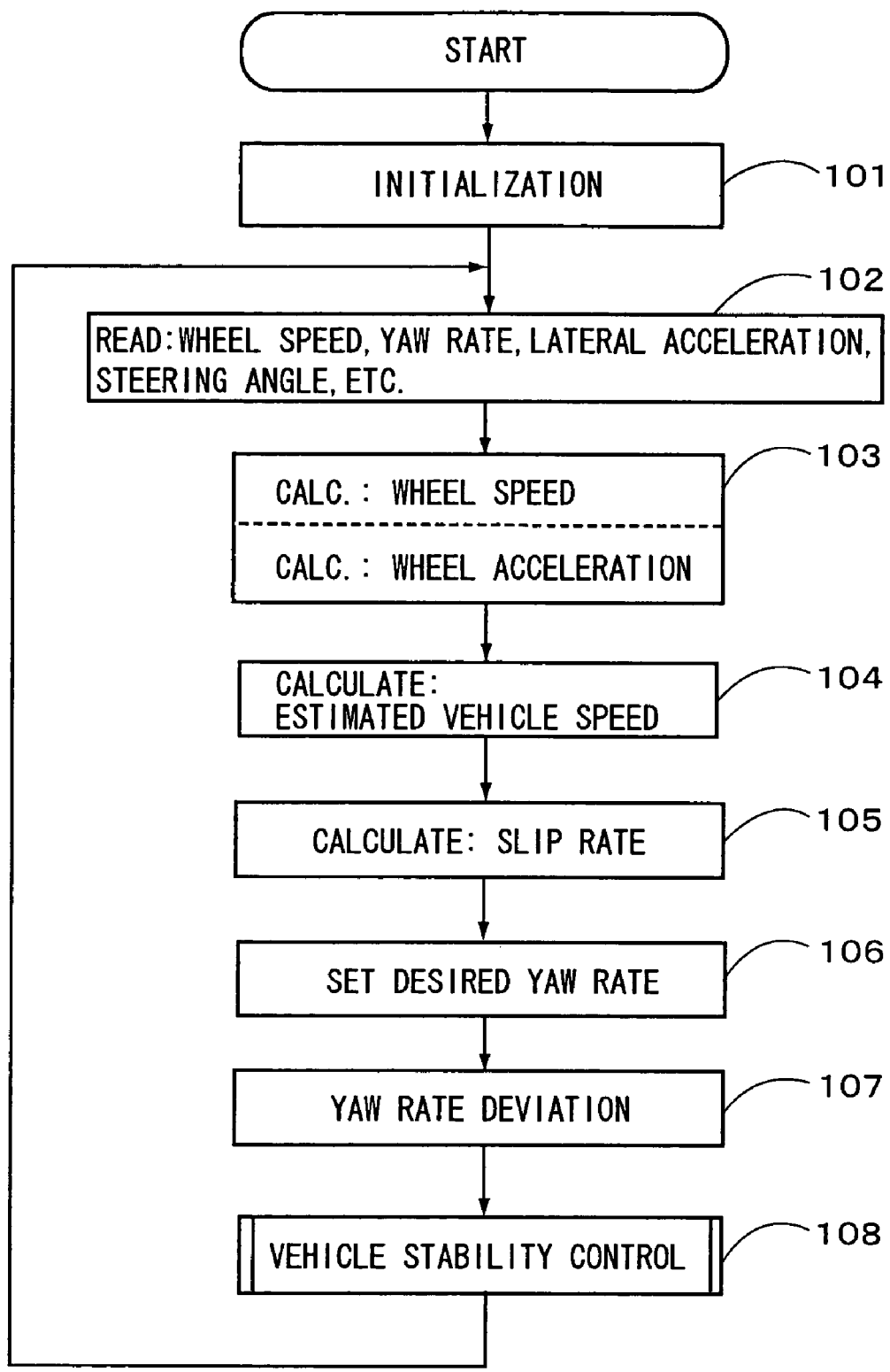
FIG. 4 is a flowchart showing a main routine of a vehicle motion control according to an embodiment of the present invention.
Figure 5:
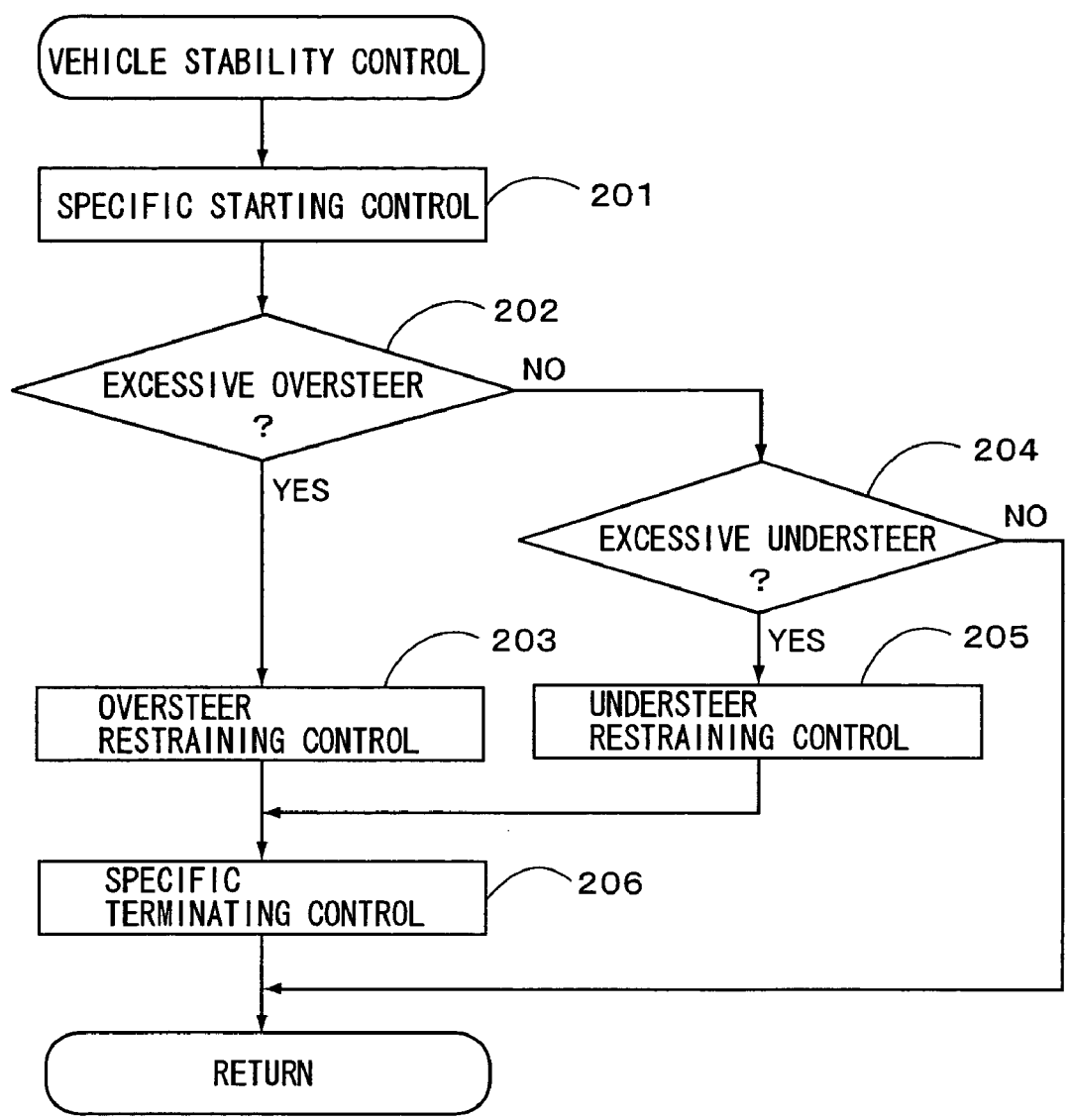
FIG. 5 is a flowchart showing a subroutine of a vehicle stability control according to an embodiment of the present invention.
Figure 6:
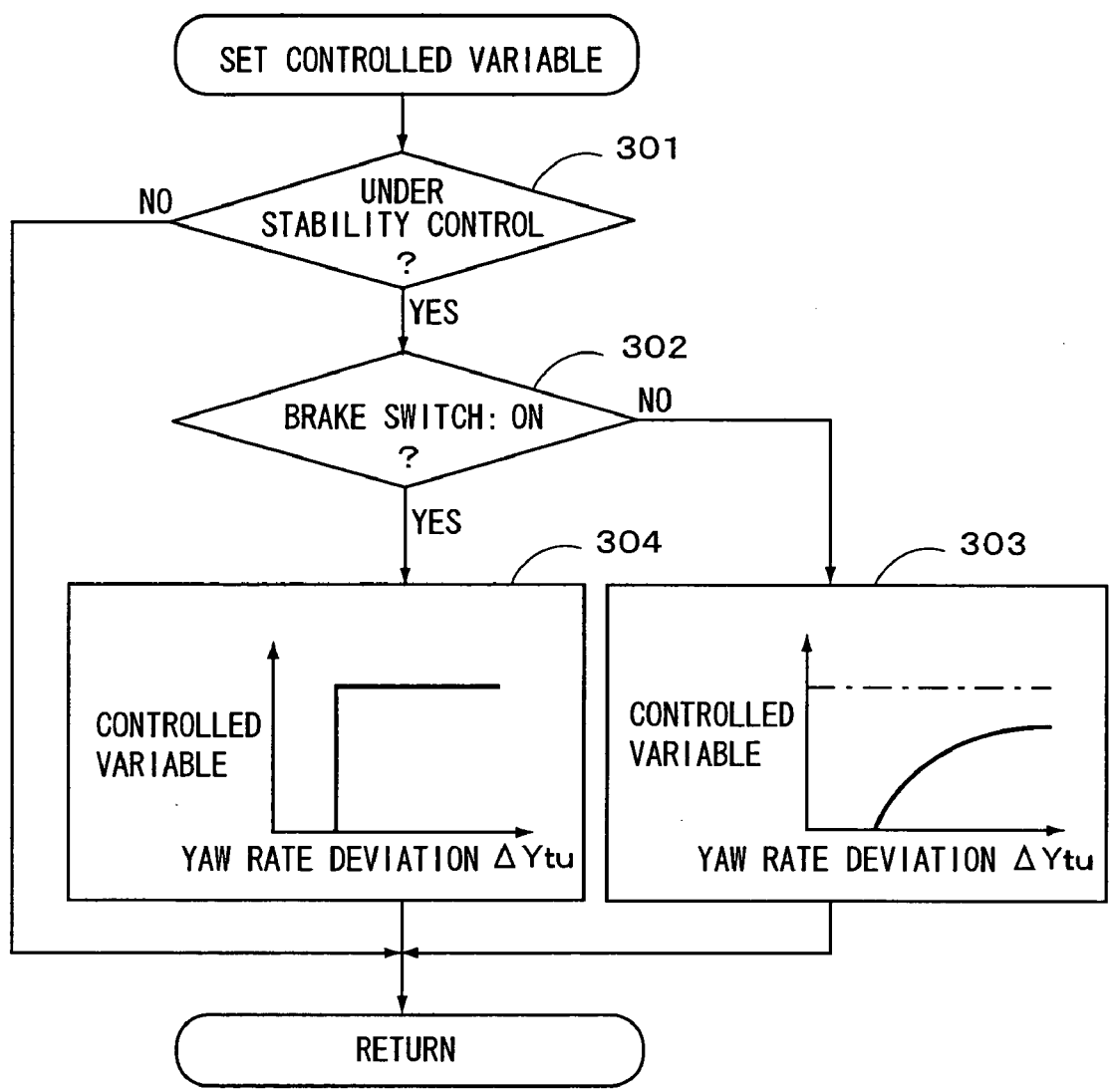
FIG. 6 is a flowchart showing a subroutine of setting controlled variable for the stability control, according to an embodiment of the present invention.

As shown in FIG. 2, the electronic control unit ECU is provided with a microcomputer CMP which includes a central processing unit or CPU, a read-only memory or ROM, a random access memory or RAM, an input port IPT, an output port OPT and the like. The signals detected by the wheel speed sensors WS1–WS4, yaw rate sensor YS, lateral acceleration sensor YG, steering angle sensor SR, brake switch BS and the like are fed to the input port IPT via respective amplification circuits AMP and then to the central processing unit CPU. Then, control signals are fed from the output port OPT to the throttle control apparatus TH and hydraulic brake control apparatus BC via the respective driving circuits ACT. In the microcomputer CMP, the memory ROM memorizes a program corresponding to flowcharts as shown in FIGS. 4–6, the central processing unit CPU executes the program while the ignition switch (not shown) is closed, and the memory RAM temporarily memorizes variable data required to execute the program. In the electronic control unit ECU, therefore, the control unit MB as shown in FIG. 1 is constituted to operate as will be described later.

Next, referring to FIG. 3, will be explained the hydraulic brake system including the hydraulic brake control apparatus BC as described above. According to the present embodiment, a master cylinder MC is activated though a vacuum booster VB in response to depression of the brake pedal BP to pressurize the brake fluid in a low-pressure reservoir LRS and discharge the master cylinder pressure to the hydraulic circuits for the wheels FR and RL, and the wheels FL and RR, respectively. The master cylinder MC is of a tandem type having two pressure chambers communicated with the first and second hydraulic circuits HC1 and HC2, respectively. That is, a first pressure chamber MCa is communicated with a first hydraulic circuit HC1 for the wheels FR and RL, and a second pressure chamber MCb is communicated with a second hydraulic circuit HC2 for the wheels FL and RR. Thus, according to the present embodiment, the hydraulic circuit system is divided into two hydraulic circuits (HC1 and HC2) to form a diagonal circuit (so called X-circuit) system, while a front-rear dual circuit system may be formed.

In the first hydraulic circuit HC1 for the wheels FR and RL, the first pressure chamber MCa is communicated with wheel brake cylinders Wfr and Wrl, respectively, through a main hydraulic passage MF and its branch hydraulic passages MFr and MFl. In the main passage MF, there is disposed a normally open solenoid operated linear proportional valve SC1. Also, the first pressure chamber MCa is connected through an auxiliary hydraulic passage MFc to a passage between the check valves CV5 and CV6, which will be described later. In the auxiliary passage MFc, there is disposed a normally closed solenoid operated inlet valve SI1. In parallel with the proportional valve SC1, there are disposed a relief valve RV1 which prevents the brake fluid in the master cylinder MC from flowing to a downstream direction (toward the wheel brake cylinders Wfr and Wrl), and allows the brake fluid to flow toward the master cylinder MC when the braking pressure at the downstream side is more than the braking pressure at the master cylinder MC by a predetermined pressure difference, and a check valve AV1 which allows the flow of the brake fluid to the downstream direction (toward the wheel brake cylinders Wfr and Wrl), and prevents its reverse flow. The relief valve RV1 is provided for returning the brake fluid to the low-pressure reservoir LRS through the master cylinder MC when the pressurized braking pressure discharged from the hydraulic pressure pump HP1 is more than the braking pressure discharged from the master cylinder MC by the predetermined pressure difference, thereby to regulate the braking pressure discharged from the hydraulic pressure pump HP1 not to exceed a predetermined upper limit pressure. According to the present embodiment, therefore, the proportional pressure difference valve device PD1 is constituted by the relief valve RV1 and the proportional valve SC1. The proportional valve SC1 is controlled by the electronic control unit ECU, so that the pressure difference between the hydraulic pressure at the side of the master cylinder MC and the hydraulic pressure at the side of normally open two-port two position solenoid operated switching valves NOfr and NOrl is regulated to provide the desired pressure difference, within a range less than the predetermined upper limit pressure provided by the relief valve RV1. Because of the check valve AV1, even if the proportional valve SC1 is in its closed position, when the brake pedal BP is depressed, the hydraulic braking pressure in the wheel brake cylinders Wfr and Wrl can be increased.

The normally open two-port two position solenoid operated switching valves NOfr and NOrl (hereinafter, simply referred to as normally open valves NOfr and NOrl), are disposed in the branch passages MFr and MFl, respectively, and in parallel therewith check valves CV1 and CV2 are disposed, respectively. The check valves CV1 and CV2 are provided for allowing the flow of the brake fluid toward the master cylinder MC and preventing the flow of the brake fluid toward the wheel brake cylinders Wfr and Wrl. The brake fluid in the wheel brake cylinders Wfr and Wrl is returned to the master cylinder MC, and then to the low-pressure reservoir LRS through the check valves CV1 and CV2, and the proportional valve SC1 placed in its first position as shown in FIG. 1. Accordingly, if the brake pedal BP is released, the hydraulic braking pressure in each of the wheel brake cylinders Wfr and Wrl is rapidly reduced to the pressure lower than the pressure at the master cylinder MC. And, normally closed two-port two position solenoid operated switching valves NCfr and NCrl (hereinafter, simply referred to as normally closed valves NCfr and NCrl) are disposed in the branch passages RFr and RFl, respectively, which merge into the drain passage RF connected to the reservoir RS1.

In the first hydraulic circuit HC1 for the wheels FR and RL, a hydraulic pressure pump HP1 is disposed in a passage MFp connected to the branch passages MFr and MFl at the upstream of the normally open valves NOfr and NOrl. The hydraulic pressure pump HP1 is connected to the reservoir RS1 at its inlet side through check valves CV5 and CV6, and connected at its outlet side to the normally open valves NOfr and NOrl through a check valve CV7 and a damper DP1. The hydraulic pressure pump HP1 is driven by a single electric motor M together with a hydraulic pressure pump HP2 to introduce the brake fluid from the inlet, pressurize the brake fluid to a predetermined pressure, and discharge it from the outlet. The reservoir RS1 is disposed independently of the low-pressure reservoir LRS of the master cylinder MC, and provided with a piston and a spring to function as an accumulator for storing a necessary volume of the brake fluid for various controls.

The master cylinder MC is connected to a passage between the check valves CV5 and CV6 disposed at the inlet side of the hydraulic pressure pump HP1 through the auxiliary passage MFc. The check valve CV5 is provided for preventing the flow of the brake fluid toward the reservoir RS1 and allowing the reverse flow. The check valves CV6 and CV7 are provided for restricting the flow of the brake fluid discharged from the hydraulic pressure pump HP1 in a predetermined direction, and generally formed within the hydraulic pressure pump HP1 in a body. Accordingly, the inlet valve SI1 is normally placed in its closed position as shown in FIG. 3, where the communication between the master cylinder MC and the inlet of the hydraulic pressure pump HP1 is blocked, and switched to its open position, where the master cylinder MC is communicated with the inlet of the hydraulic pressure pump HP1.

In the second hydraulic circuit HC2 for the wheels FL and RR, there are disposed a reservoir RS2 and a proportional solenoid valve SC2 which constitute the proportional pressure difference valve device PD2, damper DP2, normally closed two-port two-position solenoid operated inlet valve SI2, normally open valves NOfl and NOrr, normally closed valves NCfl and NCrr, check valves CV3, CV4 and CV8–CV10, relief valve RV2, and check valve AV2. The hydraulic pressure pump HP2 is driven by the electric motor M together with the hydraulic pressure pump HP1, both of the pumps HP1 and HP2 will be driven continuously after the motor M begins to operate them. The proportional valve SC2, inlet valve SI2 and normally open valves NOfl and NOrr, and normally closed valves NCfl and NCrr are controlled by the electronic control unit ECU to perform the vehicle stability control.

According to the hydraulic brake system as described above, every valves are placed in their normal positions as shown in FIG. 3, and the motor M is stopped, during the normal braking operation. When the brake pedal BP is depressed in the state as shown in FIG. 3, the master cylinder MC is actuated to discharge the master cylinder pressure from the first and second pressure chambers MCa and MCb to the first hydraulic circuit HC1 for the wheels FR and RL, and the second hydraulic circuit HC2 for the wheels FL and RR, respectively, and supply the hydraulic braking pressure into the wheel brake cylinders Wfr, Wrl, Wfl and Wrr, through the proportional valves SC1 and SC2, and the normally open valves NOfr, NOrl, NOfl and NOrr placed in their open positions. During the braking operation, when the wheel RL tends to be locked for example, and the anti-skid control begins, the normally open valve NOfr for the other wheel FR is placed in its closed position to hold the hydraulic braking pressure therein. In the pressure decreasing mode, the normally open valve NOrl is placed in its closed position, and the normally closed valve NCrl is placed in its open position. As a result, the wheel brake cylinder Wrl is communicated with the reservoir RS1 through the normally closed valve NCrl, so that the brake fluid in the wheel brake cylinder Wrl is drained into the reservoir RS1 to reduce the hydraulic braking pressure in the wheel brake cylinder Wrl.

When a pulse-increase pressure mode is selected for the wheel brake cylinder Wrl, the normally closed valve NCrl is placed in its closed position and then the normally open valve NOrl is placed in its open position, so that the master cylinder pressure is supplied from the master cylinder MC to the wheel brake cylinder Wrl through the proportional valve SC1 and the normally open valve NOrl in their open positions. Then, the normally open valve NOrl is opened and closed alternately, so that the hydraulic braking pressure in the wheel brake cylinder Wrl is increased and held repeatedly like pulses thereby to be increased gradually. When a rapid increase pressure mode is selected for the wheel brake cylinder Wrl, the normally closed valve NCrl is placed in its closed position, and then the normally open valve NOrl is placed in its open position, so that the master cylinder pressure is supplied from the master cylinder MC to the wheel brake cylinder Wrl. When the brake pedal BP is released and the master cylinder pressure comes to be lower than the pressure in the wheel brake cylinder Wrl, the brake fluid in the wheel brake cylinder Wrl is returned to the master cylinder MC through the check valve CV2 and the proportional valve SC1 placed in its open position, and consequently to the low pressure reservoir LRS. Thus, an independent braking force control is performed with respect to each wheel.

According to the vehicle stability control, however, the proportional valve is actuated in accordance with the vehicle state to regulate the hydraulic pressure in the wheel brake cylinder for the wheel to be controlled (abbreviated to controlled wheel), in the normal state where the normally open valves are placed in their open positions and the normally closed valves are placed in their closed positions, without the aforementioned pressure decreasing control being made by placing the normally closed valve in its open position so as to reduce the hydraulic pressure in the wheel brake cylinder operatively associated with the controlled wheel. In the case where the wheel brake cylinder Wrl is to be controlled for the vehicle stability control, for example, the normally open valve NOfr provided for the wheel brake cylinder Wfr operatively associated with the wheel FR which is not to be controlled in the same hydraulic circuit, is placed in its closed position, whereas the proportional valve SC1 is actuated in accordance with the state variable of the vehicle to regulate the hydraulic pressure in the wheel brake cylinder Wrl to provide a desired pressure, with the normally open valve NOrl placed in its open position and the normally closed valve NCrl placed in its closed position (i.e., in their normal positions as shown in FIG. 3).

According to the present embodiment as constituted above, a program routine for the vehicle stability control is executed by the electronic control unit ECU, as will be described hereinafter with reference to FIG. 4. The program routine starts when an ignition switch (not shown) is turned on. At the outset, the program provides for initialization of the system at Step 101 to clear various data, and proceeds to Steps 102–108, which are repeated at a predetermined time period. At Step 102, read by the electronic control unit ECU are the signals indicative of the vehicle state such as wheel speed Vw, yaw rate Ya, lateral acceleration Gy, steering angle As and the like, which are detected by the wheel speed sensors WS1–WS4, yaw rate sensor YS, lateral acceleration sensor YG, steering angle sensor SR, brake switch BS and the like. Those signals are filtered, and stored in the memory. Then, the program proceeds to Step 103 where a reference wheel speed of each wheel is calculated on the basis of the wheel speeds (Vw) output from the wheel speed sensors WS1–WS4, and it is differentiated to provide a wheel acceleration of each wheel. According to the present embodiment, the detected wheel speeds are converted into a speed on the gravity center of the vehicle, on the basis of which the reference wheel speed Vr is calculated for each wheel. Then, an estimated vehicle speed V is calculated at Step 104, and a slip rate, or wheel slip, is calculated at Step 105. The details of those calculations made at Steps 103–105 are described in detail in the Japanese Patent Laid-open publication No. 10-24821.

Next, at Step 106, on the basis of the state variable of the vehicle as described above, a desired yaw rate is calculated. In this embodiment, a desired yaw rate Yto for the oversteer restraining control and a desired yaw rate Ytu for the understeer restraining control are provided as follows:

At the outset, the desired yaw rate Yto is calculated on the basis of the lateral acceleration Gy and estimated vehicle speed V as described above, as [Yto=Gy/V]. Then, the desired yaw rate Ytu is calculated on the basis of the lateral acceleration Gy, steering angle As, estimated vehicle speed V and etc, as follows;

$$Ytu=Gy/V+C[(V\cdot As)/\{N\cdot L\cdot(1+K\cdot V^2)\}-Gy/V],$$

where "N" indicates a steering gear ratio, "L" indicates a wheelbase, "K" indicates a stability factor, and "C" indicates a weighted factor.

Then, calculated at Step 107 are a yaw rate deviation $\Delta Yto$ (=Yto−Ya) between the actual yaw rate Ya detected by the yaw rate sensor YS and the desired yaw rate Yto, or a yaw rate deviation $\Delta Ytu$ (=Ytu−Ya) between the actual yaw rate Ya and the desired yaw rate Ytu, on the basis of which the vehicle stability control is performed at Step 108, i.e., the control for restraining the excessive oversteer and/or the excessive understeer, as will be described later in detail with reference to FIG. 5. When the yaw rate deviation $\Delta Yto$ is of negative value, it is determined that the vehicle is under the oversteer state, and otherwise it is under the understeer state.

Next, referring to FIG. 5, will be explained operation of the vehicle stability control. After a specific starting control is performed at Step 201 if necessary, the program proceeds to Step 202 where an absolute value of the deviation $\Delta Yto$ is compared with a reference value K0. If it is determined that the absolute value of the yaw rate deviation (hereinafter, referred to as deviation) $\Delta Yto$ is equal to or greater than the reference value Ko, it is determined that the vehicle is under the excessive oversteer state, the program proceeds to Step 203 where the oversteer restraining control is performed. On the contrary, if it is determined that the absolute value of the deviation $\Delta Yto$ is smaller than the reference value Ko, the program proceeds to Step 204 where the deviation $\Delta Ytu$ is compared with a reference value Ku. If it is determined that the deviation $\Delta Ytu$ is equal to or greater than the reference value Ku, it is determined that the vehicle is under the excessive understeer state, the program proceeds to Step 205 where the understeer restraining control is performed. According to the present embodiment, with respect to the wheels operatively associated with the wheel brake cylinders included in a single hydraulic circuit, the wheel FR (or FL) positioned at the front outside of the vehicle is determined to be a wheel not to be controlled (abbreviated to uncontrolled wheel), and the braking force is applied to the wheel RL (or RR) positioned at the rear inside of the vehicle on the diagonal line to the wheel FR (or FL), thereby to perform a so-called diagonal control system. In practice, the wheel cylinder pressure is held with respect to the wheel FR (or FL) positioned at the front outside of the vehicle, whereas the wheel cylinder pressure is regulated for the wheel brake cylinder Wrl (or Wrr) operatively associated with the wheel RL (or RR) positioned at the rear inside of the vehicle. After the control as described above is finished, a specific terminating control is performed at Step 206, and the program returns to the main routine as shown in FIG. 4. Although the hydraulic braking pressure in the wheel brake cylinder operatively associated with the uncontrolled wheel has been held during the understeer restraining control performed at Step 205 for the controlled wheel, the hydraulic braking pressure (wheel cylinder pressure) may be regulated with respect to the uncontrolled wheel, in accordance with the relationship with the hydraulic braking pressure in the wheel brake cylinder operatively associated with the controlled wheel.

According to the understeer restraining control and oversteer restraining control performed at Steps 203 and 205 in FIG. 5, respectively, the controlled variable is set as shown in FIG. 6. At the outset, it is determined at Step 301 whether the understeer restraining control is being performed (under control), or not. If the result is negative, the program returns to Step 206 in FIG. 5, whereas if the result is affirmative, the program proceeds to Step 302 where the state of the brake switch BS is determined at Step 303. If the brake switch BS has been turned off, i.e., the brake pedal BP has not been depressed, the program proceeds to Step 303, where the controlled variable, which reflects duty ratios for actuating the normally open valves or normally closed valves, for example, is provided for the controlled wheel, the rear inside wheel (e.g., RL) in the understeer restraining control, for example, to be set so as to be increased gradually in response to the yaw rate deviation $\Delta Ytu$. As a result, the hydraulic braking pressure in the wheel brake cylinder Wrl is regulated to be increased gradually, i.e., with a gentle pressure increasing gradient, in response to the yaw rate deviation $\Delta Ytu$.

On the contrary, if the brake pedal BP has been depressed and it is determined at Step 302 that the brake switch BS has been turned on, the program proceeds to Step 304 where the controlled variable is set to be increased rapidly when the yaw rate deviation $\Delta Ytu$ has exceeded a predetermined value. For instance, if the the yaw rate deviation $\Delta Ytu$ is equal to or greater than the predetermined value when the brake switch BS has been turned on, then the controlled variable for the controlled wheel RL may be increased rapidly up to its maximal value. For example, the duty ratio for the normally open valve NOrl may be set to be 100%. Consequently, if the brake pedal BP is depressed to terminate the stability control, the controlled variable for the controlled wheel RL will be increased rapidly up to its maximal value, to apply relatively large braking force to the controlled wheel RL immediately, whereby the understeer restraining control will be terminated immediately, to cause even the oversteer restraining control, and therefore terminated smoothly, as will be explained later.

Figure 7:
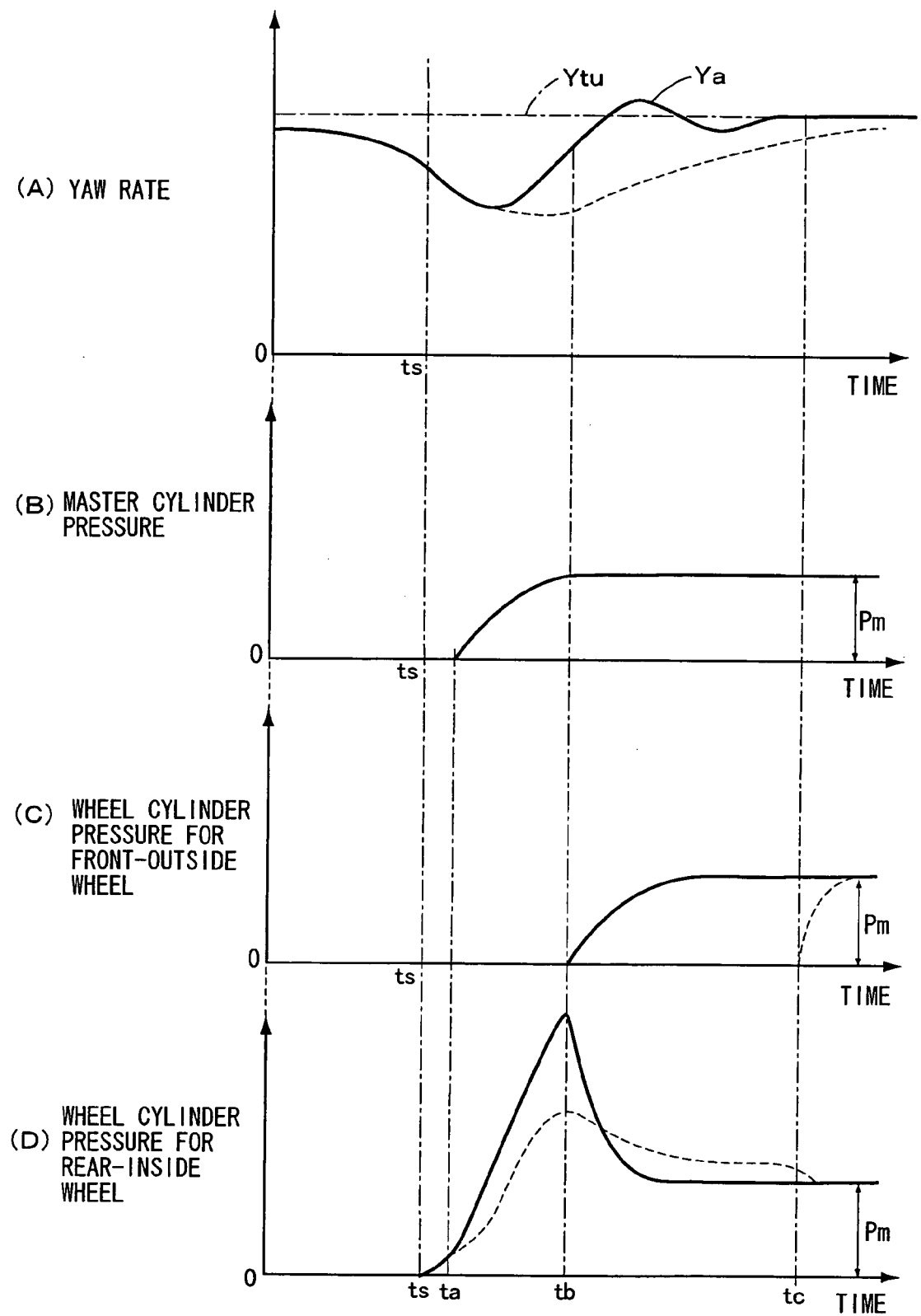
FIG. 7 is a diagram showing yaw rate, master cylinder pressure, wheel cylinder pressure for rear inside and front outside wheels, when a brake pedal is depressed during the stability control, according to an embodiment of the present invention.

The understeer restraining control out of the vehicle stability control as described above will be explained hereinafter with reference to a time chart as shown in FIG. 7, where the actual yaw rate Ya varies as indicated by a solid line in (A), and the rear inside wheel (e.g., wheel RL) is selected for the controlled wheel, as shown in (D). At the time "ts", the control begins, so that the hydraulic pressure in the wheel brake cylinder Wrl begins to be increased as indicated by a solid line. When the brake pedal BP is depressed to turn on the brake switch BS at the time "ta", the master cylinder pressure Pm is discharged, as shown in (B) of FIG. 7, the wheel cylinder pressure in the wheel brake cylinder Wrl is decreased rapidly, as indicated by a solid line in (D) of FIG. 7. In this case, the wheel cylinder pressure in the wheel brake cylinder Wrl has become the one added to the master cylinder pressure Pm by the pressure provided in response to the controlled variable as shown in Step 304 in FIG. 6. Furthermore, the increasing gradient of wheel cylinder pressure in this case is steeper than the increasing gradient of wheel cylinder pressure provided when the brake pedal BP has not been depressed, as indicated by a broken line in (D) of FIG. 7. And, when the understeer restraining control is terminated at the time "tb", the wheel cylinder pressure in the wheel brake cylinder Wrl is rapidly decreased down to the master cylinder pressure Pm, as indicated by the solid line in (D) of FIG. 7. However, in the case where the wheel cylinder pressure in the wheel brake cylinder Wrl is regulated according to the pressure increasing gradient without the brake pedal BP being depressed as indicated by the solid line in (D) of FIG. 7, the actual yaw rate Ya will be delayed to be converged on the desired yaw rate Ytu, as indicated by the broken line in (A) of FIG. 7.

In contrast, with respect to the wheel brake cylinder Wfr operatively associated with the front outside wheel FR, i.e., the uncontrolled wheel, the normally open valve NOfr is maintained to be placed in its closed position until the time "tb", so that the wheel cylinder pressure in the wheel brake cylinder Wfr is held. And, if the understeer restraining control is terminated, the wheel cylinder pressure in the wheel brake cylinder Wfr is increased up to the master cylinder pressure Pm. Furthermore, it may be so constituted that when the brake pedal BP is depressed, the uncontrolled wheel FR is applied with the braking force which is regulated to be in a certain relationship with the braking force applied to the controlled wheel RL.

Supposing that the wheel cylinder pressure in the wheel brake cylinder Wrl is regulated as indicated by the broken line in (D) of FIG. 7, the wheel cylinder pressure in the wheel brake cylinder Wfr (operatively associated with the uncontrolled wheel FR) will begin to be increased at the time "tc", so that the actual yaw rate Ya will vary as indicated by the broken line in (A) of FIG. 7. According to the present embodiment, however, the actual yaw rate Ya has been converged on the desired yaw rate Ytu at the time "tc", as indicated by the solid line in (A) of FIG. 7. Although the present embodiment as disclosed in FIGS. 6 and 7 relates to the understeer restraining control in the diagonal control system, the present embodiment (and therefore, the present invention) may be applied to the oversteer restraining control, thereby to achieve the vehicle stability control appropriately.

Figure 8:
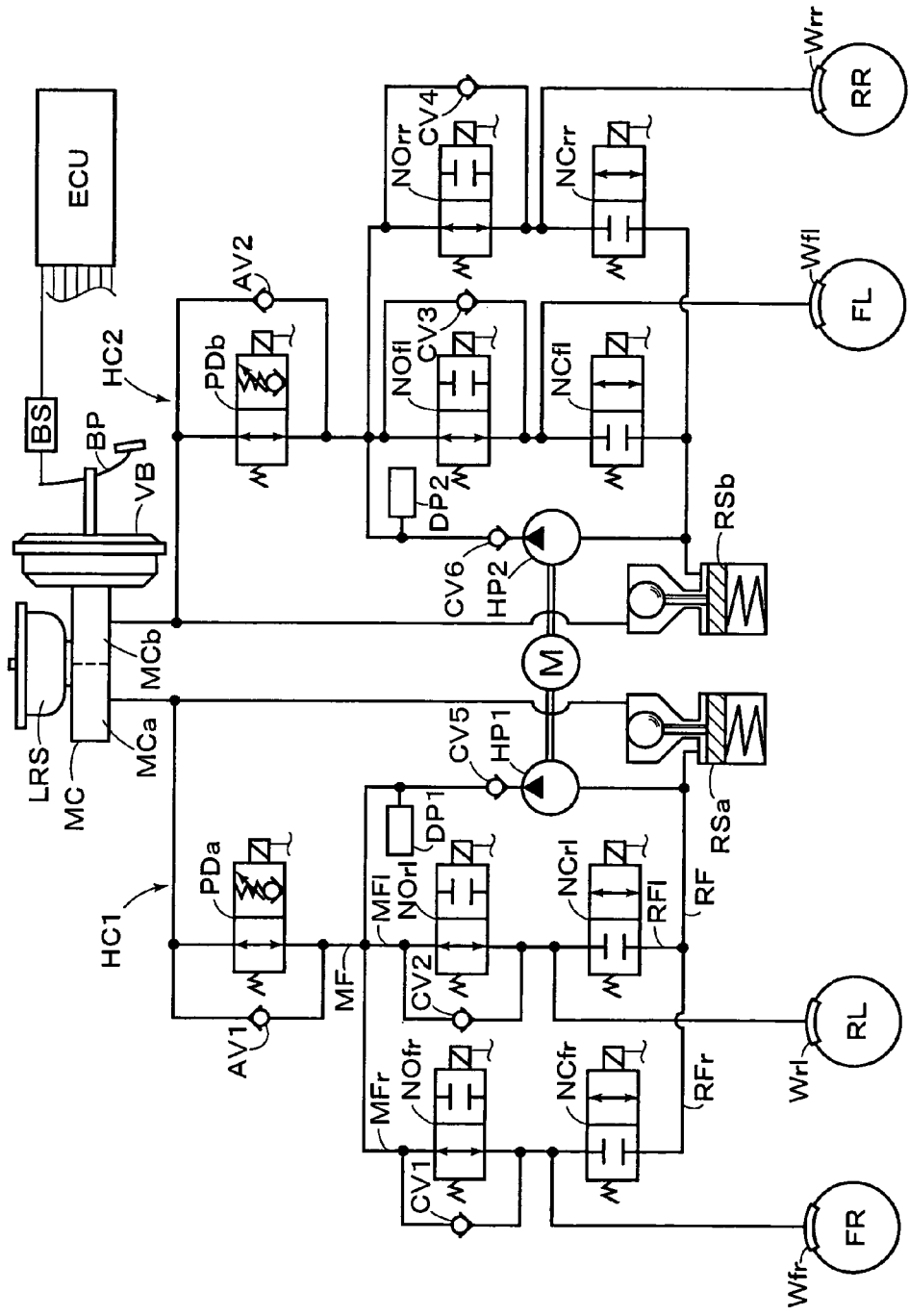
FIG. 8 is a block diagram showing a hydraulic brake system according to another embodiment of the present invention.

Next, referring to FIG. 8, will be explained another embodiment of the hydraulic brake system including the hydraulic brake control apparatus BC as shown in FIG. 2, which is provided with ten solenoid valves, i.e., smaller in number of valves by two than those required in the embodiment as shown in FIG. 3. In order to reduce the number of valves as described above, instead of the proportional pressure difference valve devices PD1 and PD2, proportional pressure difference valves PDa and PDb are employed, and instead of the inlet valves SI1 and SI2 and the reservoirs RS1 and RS2, are employed reservoirs RSa and RSb. The proportional pressure difference valves PDa and PDb are substantially the same as a valve device disclosed as a linear pressure difference valve 20 or the like in the aforementioned Japanese Publication NO. 11-301435, and the reservoirs RSa and RSb are substantially the same as a reservoir device disclosed as a reservoir 200 in the aforementioned Japanese Publication NO. 9-240455, while the control systems as a whole disclosed in those Publications are entirely different from the control system of the present embodiment.

According to the present embodiment, the proportional pressure difference valves PDa and PDb are different from a prior so-called master cylinder cut-off valve for simply cutting off the communication with the master cylinder, and they have such a function of the pressure difference valve similar to the proportional pressure difference valve devices PD1 and PD2 as shown in FIG. 3. That is, the proportional pressure difference valve PDa (or PDb) is controlled by the electronic control unit ECU to change its position between a communicating position and a pressure difference position, at the latter position of which a passage is narrowed in accordance with the pressure difference between the pressure at the side of the master cylinder MC and the pressure at the side of the normally open valves-NOfr and NOrl, which act as the cut-off valves in the same manner as the embodiment as shown in FIG. 3, to provide the desired pressure difference.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A vehicle motion control apparatus comprising:
wheel brake cylinders operatively associated with wheels of a vehicle, respectively;
a master cylinder connected to said wheel brake cylinders through a dual hydraulic circuit with a pair of wheel brake cylinders included in each hydraulic circuit, said master cylinder discharging a hydraulic braking pressure into each hydraulic circuit in response to operation of a brake pedal;
hydraulic pressure regulating means disposed between said master cylinder and said pair of wheel brake cylinders, for regulating the hydraulic braking pressure supplied into each of said pair of wheel brake cylinders;
vehicle state monitor means for monitoring state variable of said vehicle;
desired value setting means for setting a desired value provided for a wheel brake cylinder operatively associated with a wheel to be controlled, out of said pair of wheel brake cylinders included in each hydraulic circuit, said desired value setting means setting the desired value on the basis of the state variable monitored by said vehicle state monitor means; and
control means for controlling said pressure regulating means to regulate the hydraulic braking pressure in at least said wheel brake cylinder operatively associated with said wheel to be controlled, said control means setting a pressure increasing gradient of the hydraulic braking pressure in said wheel brake cylinder operatively associated with said wheel to be controlled, in response to a result of comparison between the desired value set by said desired value setting means and the state variable monitored by said vehicle state monitor means, with the pressure increasing gradient provided when said brake pedal is depressed being set to be steeper than the pressure increasing gradient provided when said brake pedal is not depressed;
wherein said hydraulic pressure regulating means in each of said hydraulic circuits comprises;
normally open switching valves each disposed between said master cylinder and each of said pair of wheel brake cylinders, each of said normally open switching valves supplying the hydraulic braking pressure discharged from said master cylinder into each of said pair of wheel brake cylinders when each of said normally open switching valves is placed in an open position thereof,
normally closed switching valves each connected to a passage between each of said normally open switching valves and each of said pair of wheel brake cylinders, each of said normally closed switching valves reducing the hydraulic braking pressure in each of said pair of wheel brake cylinders when each of said normally closed switching valves is placed in an open position thereof,
proportional pressure difference valve means disposed between said master cylinder and said normally open switching valves in each hydraulic circuit, said proportional pressure difference valve means regulating a pressure difference between the hydraulic pressure at the side of said master cylinder and the hydraulic pressure at the side of said normally open switching valves to provide a desired pressure difference, and
automatic hydraulic pressure generating means for generating a hydraulic braking pressure independently of said master cylinder and irrespective of operation of said brake pedal, and supplying the hydraulic braking pressure into a passage between said proportional pressure difference valve means and said normally open switching valves in each hydraulic circuit, and wherein said control means controls said normally open switching valve connected to one of said wheel brake cylinders not to be controlled in one hydraulic circuit of said dual hydraulic circuits, to be placed in the closed position, and controls said pressure generating means in response to the result of comparison between the desired value and the state variable of said vehicle monitored by said vehicle state monitor means, and wherein said control means controls said proportional pressure difference valve means, with said normally open switching valve connected to said wheel brake cylinder operatively associated with said wheel to be controlled, being placed in the open position, and with the pressure increasing gradient provided when said brake pedal is depressed being set to be steeper than the pressure increasing gradient provided when said brake pedal is not depressed.

2. The vehicle motion control apparatus as set forth in claim 1, wherein said proportional pressure difference valve means includes a proportional solenoid valve disposed between said master cylinder and said normally open switching valves in each hydraulic circuit, said proportional solenoid valve regulating the pressure difference between the hydraulic pressure at the side of said master cylinder and the hydraulic pressure at the side of said normally open switching valves to provide the desired pressure difference, and includes a relief valve disposed in parallel with said proportional solenoid valve for allowing the brake fluid to flow from said normally open switching valves toward said master cylinder when the hydraulic pressure at the side of said normally open switching valves exceeds a predetermined upper limit pressure.

3. The vehicle motion control apparatus as set forth in claim 1, wherein said proportional pressure difference valve means includes a proportional pressure difference valve disposed between said master cylinder and said normally open switching valves in each hydraulic circuit, and wherein said control means selects one of a communication position for said proportional pressure difference valve where flow of brake fluid is allowed through said proportional pressure difference valve, and a pressure difference position for said proportional pressure difference valve where flow of the brake fluid is restricted on the basis of the pressure difference between the hydraulic pressure at the side of said master cylinder and the hydraulic pressure at the side of said normally open switching valves to provide the desired pressure difference.

4. The vehicle motion control apparatus as set forth in claim 1, further comprising a reservoir for storing brake fluid drained from said pair of wheel brake cylinders, wherein said pressure generating means includes a hydraulic pressure pump for receiving therein the brake fluid from at least one of said reservoir and said master cylinder, and pressurizing the brake fluid in response to output from said control means, to discharge the hydraulic braking pressure.

5. The vehicle motion control apparatus as set forth in claim 1, wherein said vehicle state monitor means includes yaw rate detection means for detecting an actual yaw rate of said vehicle, and wherein said control means comprises;

desired yaw rate setting means for setting a desired yaw rate served as said desired value, and yaw rate deviation calculation means for calculating a yaw rate deviation between the desired yaw rate set by said desired yaw rate setting means and the actual yaw rate detected by said yaw rate detection means, and wherein said control means sets the pressure increasing gradient on the basis of the yaw rate deviation calculated by said yaw rate deviation calculation means.

* * * * *